(12) United States Patent
Morinaga (10) Patent No.: US 7,004,586 B2
(45) Date of Patent: Feb. 28, 2006

(54) IMAGE DISPLAYING PROJECTOR WITH A LIGHT TUNNEL AND LIGHT TUNNEL STRUCTURE IN AN IMAGE DISPLAYING PROJECTOR

(75) Inventor: Kenichi Morinaga, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/669,604

(22) Filed: Sep. 25, 2003

(65) Prior Publication Data

US 2004/0090598 A1 May 13, 2004

(30) Foreign Application Priority Data

Sep. 25, 2002 (JP) ............................. 2002-006041

(51) Int. Cl.
G03B 21/14 (2006.01)
F21V 7/04 (2006.01)
G02B 6/10 (2006.01)
G02B 6/122 (2006.01)
G02F 1/025 (2006.01)

(52) U.S. Cl. ..................... 353/20; 353/119; 362/551; 349/58

(58) Field of Classification Search .................. 353/31, 353/33, 81, 97, 20, 119, 38; 349/5, 57, 58, 349/62; 362/26, 551, 581; 385/901, 133, 385/33–35, 39, 136; 359/894
See application file for complete search history.

(56) References Cited

U.S. PATENT DOCUMENTS

| | | | | |
|---|---|---|---|---|
| 5,902,033 A | * | 5/1999 | Levis et al. | 353/122 |
| 6,364,493 B1 | * | 4/2002 | Kakuta et al. | 353/122 |
| 6,773,118 B1 | * | 8/2004 | Lee | 353/122 |
| 2003/0098956 A1 | * | 5/2003 | Chang et al. | 353/52 |

FOREIGN PATENT DOCUMENTS

| | | |
|---|---|---|
| JP | 08-271854 | 10/1996 |
| JP | 08-286146 | 11/1996 |
| JP | 10-048746 | 2/1998 |
| JP | 2002-131840 | 5/2002 |
| WO | WO 00/26721 | 5/2000 |

* cited by examiner

Primary Examiner—W. B. Perkey
Assistant Examiner—Andrew Sever
(74) Attorney, Agent, or Firm—Crowell & Moring LLP (57) ABSTRACT

An image displaying projector is provided comprising a lamp for emitting the light for image projection, a light tunnel for receiving the light from the lamp at one end opening of a tubular portion thereof which has two openings provided at both ends, guiding the light as it reflects on an inner side of the tubular portion, and releasing the light from the other end opening of the tubular portion, and an imaging device for producing an optical image by means of the light released from the light tunnel. The light tunnel is made of a thin metal sheet folded to shape the tubular portion which has two openings provided at both ends. The image displaying projector can easily be manufactured fewer of components and steps. The thin metal sheet prevents the light tunnel from being heated up and fractured by the heat lamp.

9 Claims, 12 Drawing Sheets

IMAGE DISPLAYING PROJECTOR WITH A LIGHT TUNNEL AND LIGHT TUNNEL STRUCTURE IN AN IMAGE DISPLAYING PROJECTOR

BACKGROUND OF THE INVENTION

1. Field of the Invention

The present invention relates to an image displaying projector for projecting an image onto a screen and a light tunnel structure in an image displaying projector.

2. Description of the Related Art

Figure 9:
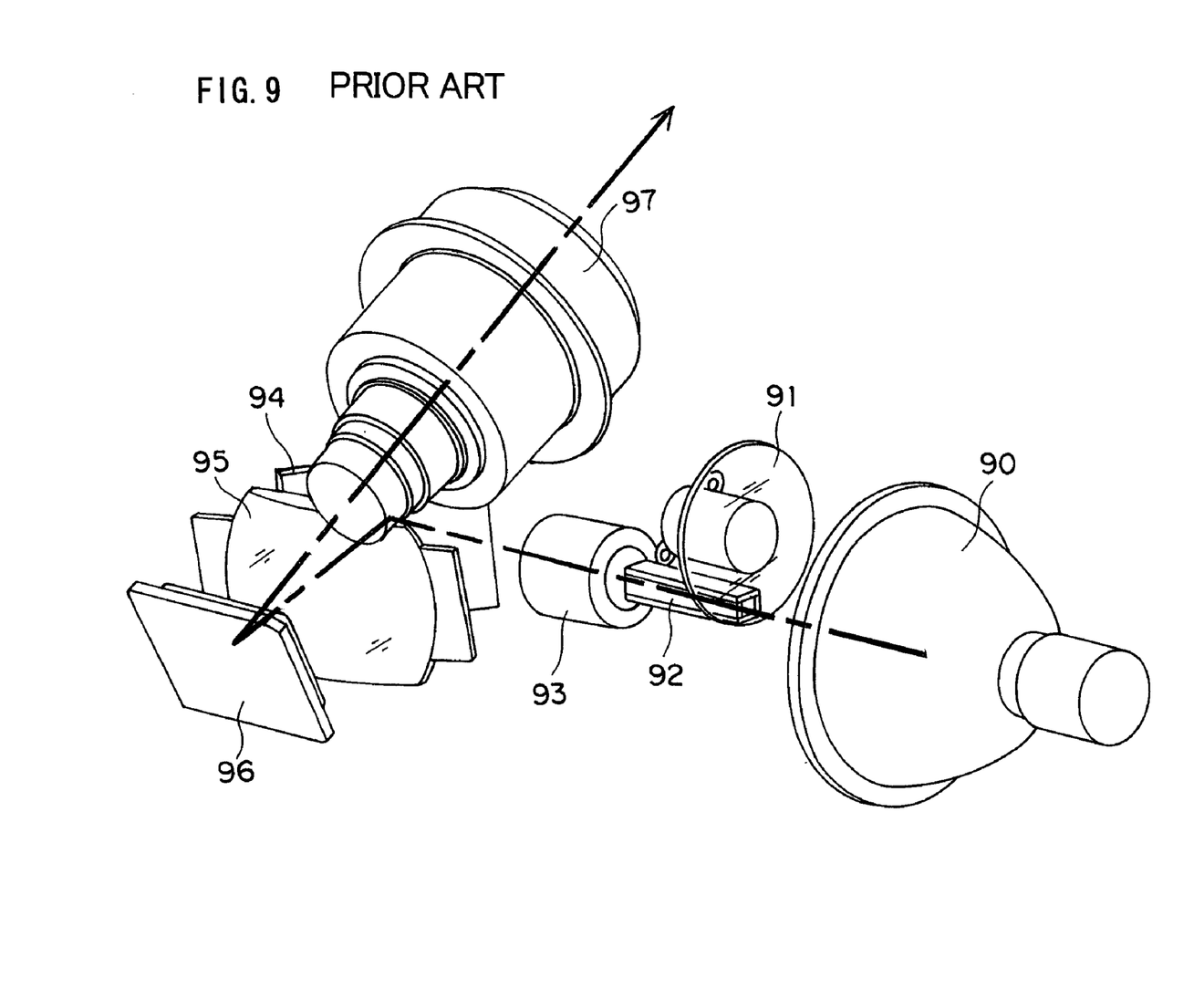
FIG. 9 is a perspective view of a conventional optical image projection system.

An image displaying projector is known for producing an optical image on its imaging device from its image data supplied by a personal computer or a video camera and projecting it on a screen for display. Such a conventional image displaying projector includes commonly an image projection system shown in FIG. 9 where a light tunnel 92 is provided for condensing and collimating the light received from a lamp 90. In the image projection system, the light emitted from the lamp 90 (its optical axis denoted by the one-dot chain line with the arrow) is colored by a color wheel 91 and then condensed and collimated by the light tunnel 92 before compensated for waveform effects by a corrective lens 93. The light from the lamp 90 is reflected by a mirror 94, converged by a relay lens 95, and directed to an imaging device 96. As the light is reflected on an image forming plane of the imaging device 96, an image produced on the image forming plane can be projected by a projection lens 97.

Figure 10:
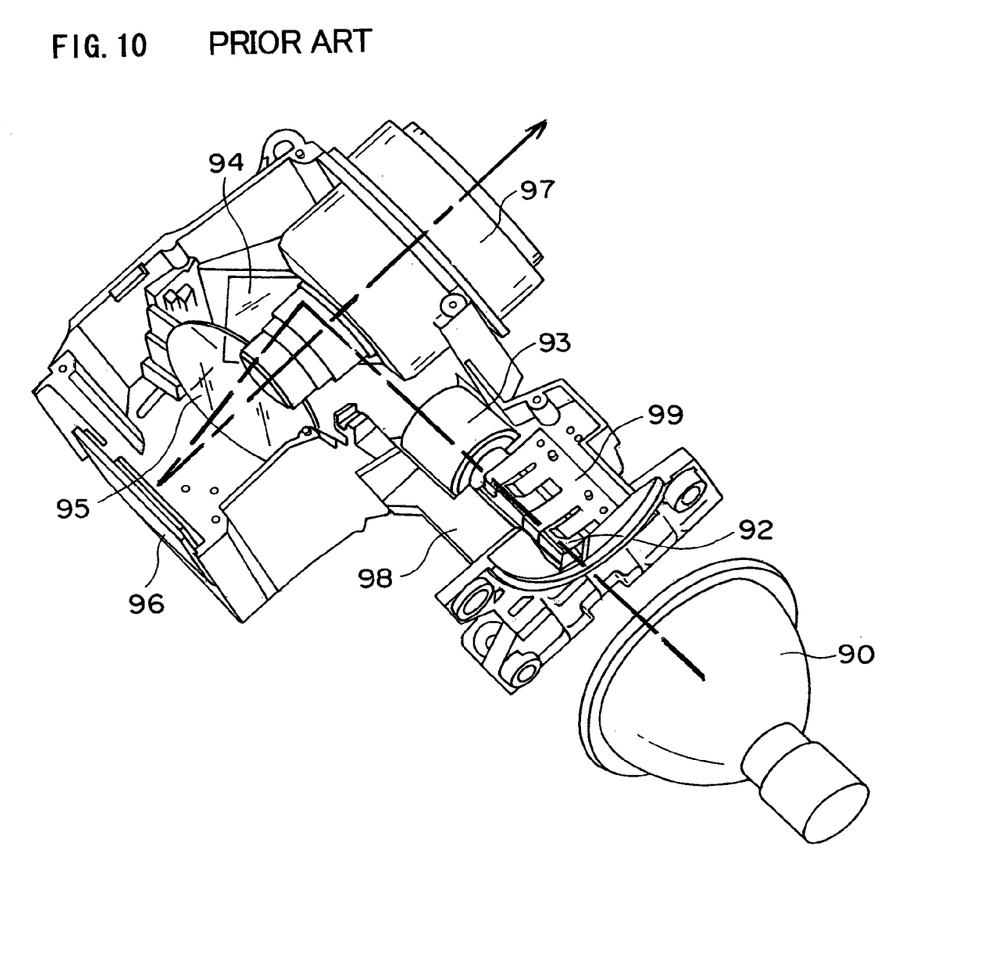
FIG. 10 is a perspective view of the conventional optical image projection system mounted to a support base.
Figure 11:
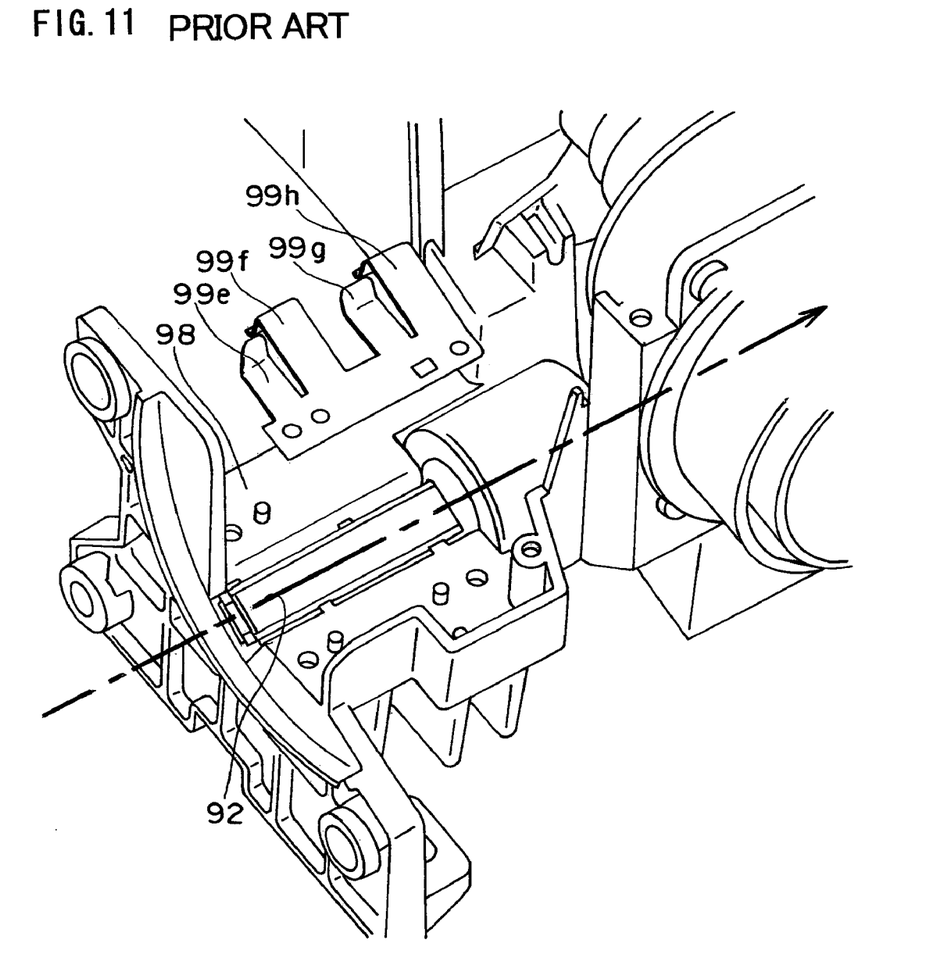
FIG. 11 is a perspective view of a conventional light tunnel with a fitting.

Those components in the conventional image displaying projector are commonly assembled together with a support base 98 and installed in a housing, as shown in FIG. 10. Meanwhile, the color wheel 91 is not illustrated for simplicity. The lamp 90 is separately provided as it has to be replaced with a new one. The light tunnel 92 comprises four glass members bonded together to a tubular shape and mounted to the support base 98 by a metal retainer spring (fitting) 99 pressing down. The retainer spring 99 has a set of elastic press-down tabs 99e, 99f, 99g, and 99h as best shown in FIG. 11. When the retainer spring 99 is joined by screws (not shown) to the support base 98, its press-down tabs 9e, 99f, 99g, and 99h securely hold down the light tunnel 92.

It is however necessary for the light from the lamp 90 effectively reflecting on the imaging device 96 to adjust the angle at which the light tunnel 92 is mounted to the support base 98. The angle adjustment for the light tunnel 92 is conducted with an angle adjusting spring (not shown) operated to lift up and hold the light tunnel 92 and then pressed down by a couple of angle adjusting screws (not shown).

Figure 12:
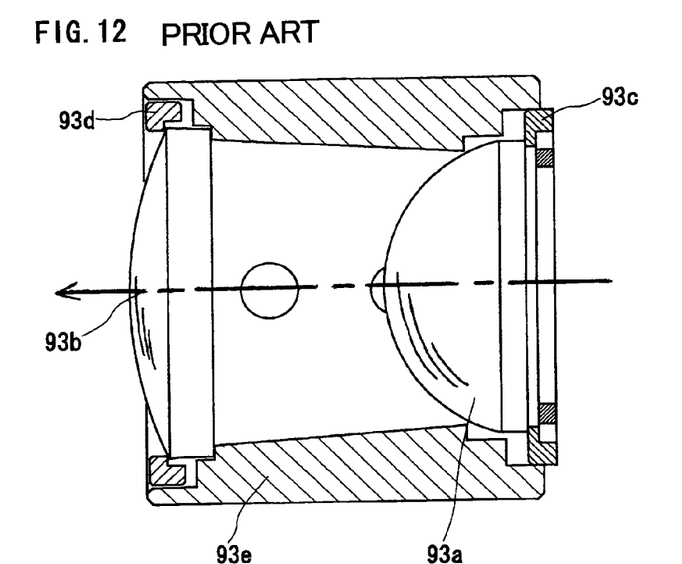
FIG. 12 is a cross sectional view of a corrective lens in the conventional arrangement.
Figure 13:
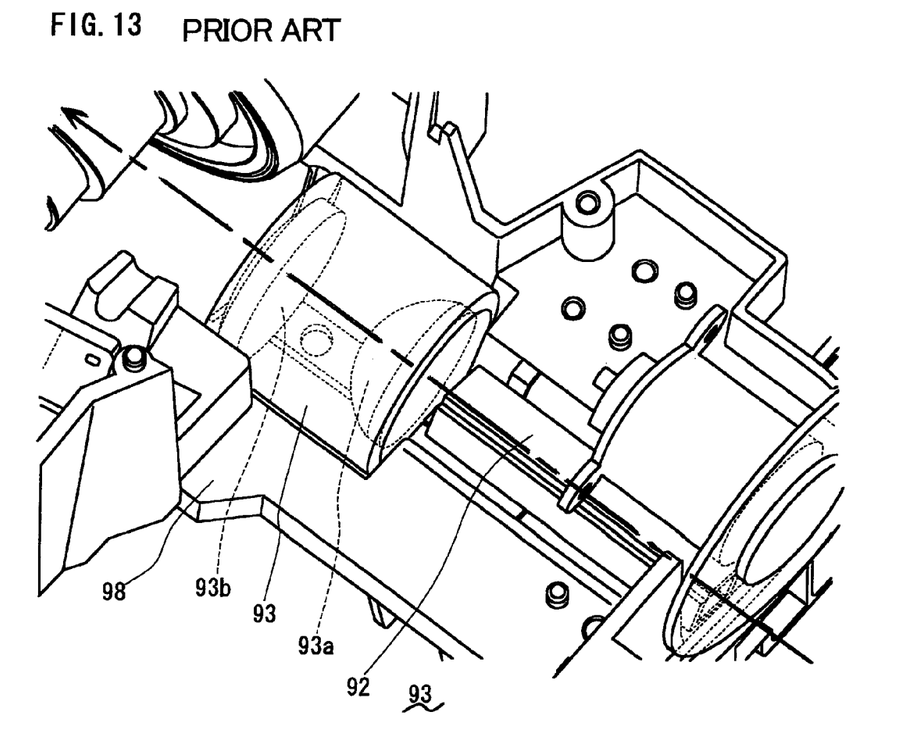
FIG. 13 is a perspective view of the corrective lens secured in the conventional arrangement.

The corrective lens 93 has two lenses 93a and 93b held together to the inner wall of a metal tube 93e by retainer rings 93c and 93d respectively, as shown in FIG. 12. The corrective lens 93 of an assembly is mounted to the support base 98 at the output end of the light tunnel 92, as shown in FIG. 13.

Alternatively in a projection display using a space light modulator such as a liquid crystal light valve, a light tunnel arranged in the cross section to match a geometrical shape of the space light modulator is provided between the light source lamp and the space light modulator for optimizing the intensity of light to be projected onto a screen (for example, as disclosed in Japanese Patent Laid-Open Publication HEI8-271854). Also, a liquid crystal projector is introduced in which a light tunnel arranged to match in the aspect ratio with an imaging device is provided between the light source and the imaging device (for example as disclosed in Japanese Patent Laid-Open Publication HEI8-286146). Moreover, an illuminating apparatus for a projector is equipped with a light tunnel of which the input end for receiving light from the light source is smaller in the cross section than the output end (for example, as disclosed in Japanese Patent Laid-Open Publication HEI10-48476).

The light tunnel in the conventional image displaying projector however has the four glass members bonded by an adhesive to a tubular form thus increasing the steps of production and resulting in the cost up. Also, the light tunnel of the glass members is mounted to the support base by the retainer spring of an extra component. Furthermore, as the light tunnel is exposed to the light from the lamp, it is heated up and its glass members which are low in the radiation of heat may deteriorate or fracture. When the light emitted from the lamp is incident to one end plane of the light tunnel, it enters the glass members and its output from the other end may interrupt the image to be projected.

The adjustment of the angle for the light tunnel is made by the angle adjusting spring lifting the light tunnel and the angle adjusting screws determining the angle. Accordingly, its arrangement becomes intricate while the action of the angle adjusting is not easy. The corrective lens has the two lenses held in the lens holding tube with retaining rings and the assembly is mounted to the support base. This will increase the number of the components as well as the number of the production steps and hardly reduce the cost. Also, the other prior arts disclosed in Japanese Patent Laid-Open Publications HEI8-271854, HEI8-286146, and HEI10-48476 fail to eliminate the foregoing drawbacks.

SUMMARY OF THE INVENTION

The present invention has been developed for eliminating the foregoing drawbacks and its object is to provide an image displaying projector and a light tunnel structure in an image displaying projector where the light tunnel is made of a thin metal sheet bent to a tubular form acting as a holder for a corrective lens and can be mounted to a support base with no use of extra fittings while its angle for mounting is adjusted with ease.

According to an aspect of the present invention, an image displaying projector for producing and projecting an optical image, comprises: a lamp for emitting a light for image projection; a light tunnel having a tubular portion and an opening provided at each end, which receives the light from the lamp at one end opening of the tubular portion, and guides the light as it reflects on an inner side of the tubular portion, and releases it from the opening at the other end of the tubular portion; and an imaging device for producing an optical image by means of the light released from the light tunnel, wherein the light tunnel is made of a thin metal sheet folded to shape the tubular portion which has an opening provided at each end.

Since the light tunnel according to the present invention is made of the thin metal sheet bent to a tubular form, it requires no conventional step of bonding four glass sheets to a tubular form with the use of an adhesive and allows its structure to be fabricated with a less number of components and a less number of steps, hence significantly decreasing its production cost. Also, the light tunnel made of the thin metal sheet is improved in the radiation of heat and can thus be prevented from being heated up and fractured by the heat of the light emitted from the lamp. The light tunnel allows no portions of the light received from the lamp to pass through the tubular portion material itself and interrupt an image to be projected.

According to another aspect of the present invention, a light tunnel structure in an image displaying projector for producing an optical image by means of the light guided therein through the tunnel from a lamp on an imaging device, wherein the light tunnel has a tubular portion with an opening provided at each end, which receives the light from the lamp at one end opening thereof, and guides the light as it reflects on an inner side of the tubular portion, and releases it from the opening at the other end of the tubular portion, wherein the tubular portion is made of a thin metal sheet bent to a tubular form.

The tubular portion of the light tunnel according to the present invention is made from a thin metal sheet bent to a tubular form and can thus be fabricated with a fewer number of components and a fewer number of steps, hence decreasing its production cost. Also, the tubular portion made from the thin metal sheet improves the radiation of heat and can thus prevent it from being heated up and fractured by the heat of received light.

DETAILED DESCRIPTION OF THE PREFERRED EMBODIMENTS

Figure 1:
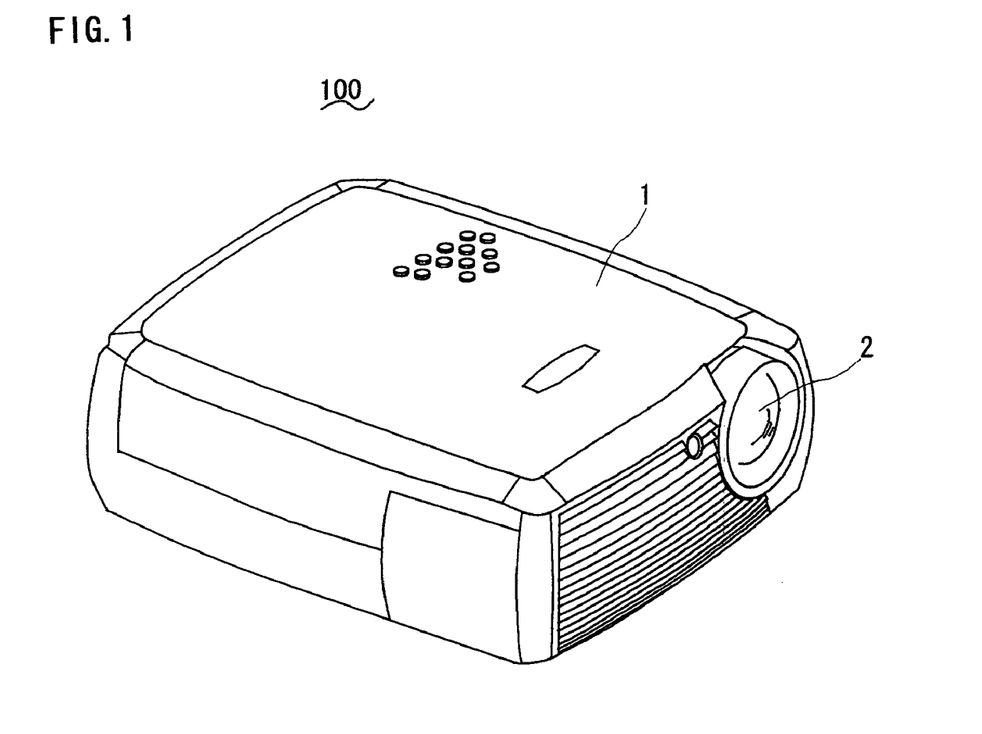
FIG. 1 is a schematically perspective view of an image displaying projector which has a light tunnel showing one embodiment of the present invention.
Figure 2:
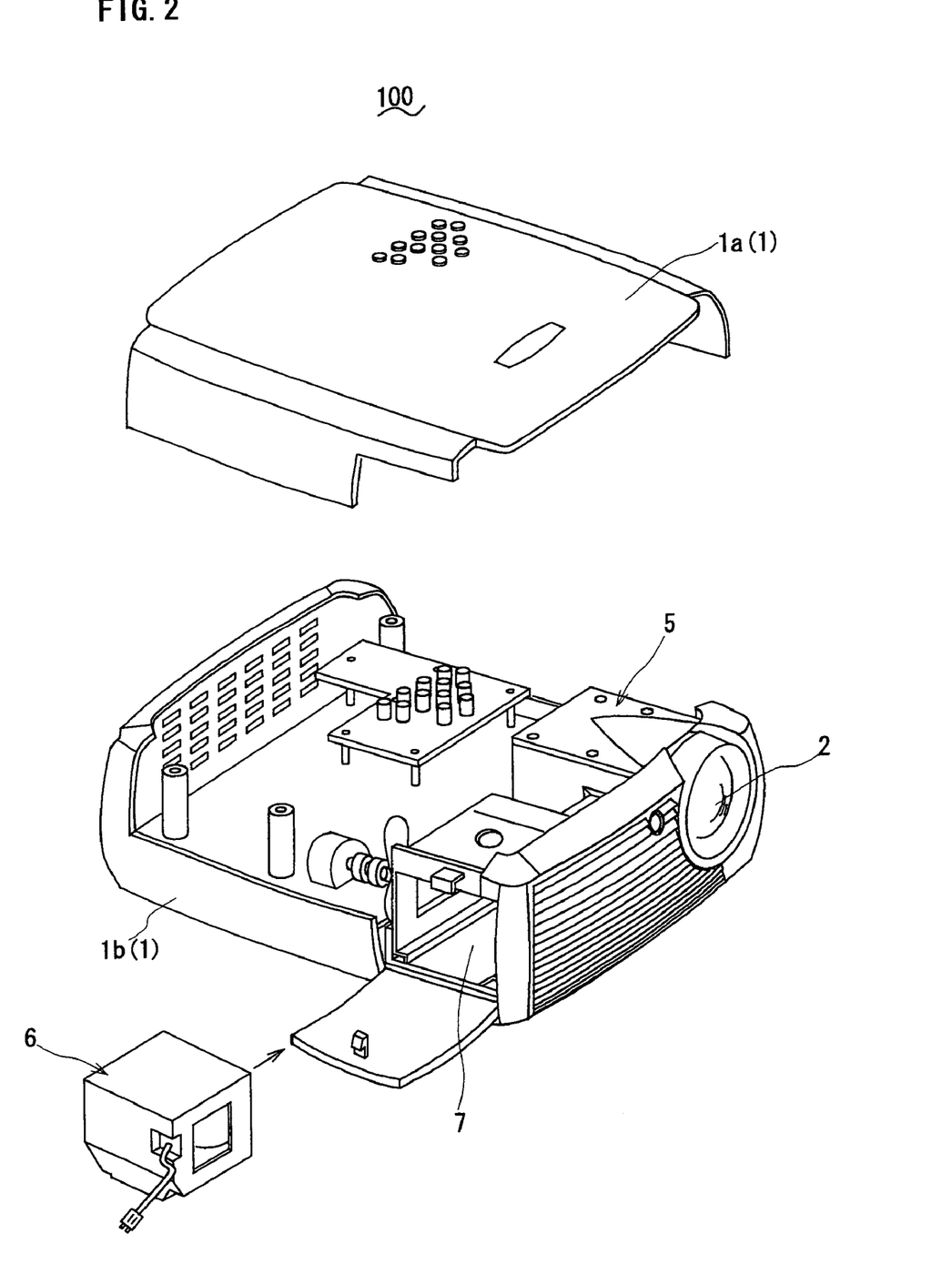
FIG. 2 is a perspective view of an interior arrangement of the image displaying projector.

Some embodiments of the present invention will be described referring to the relevant drawings. The description starts with a first embodiment of the present invention. As shown in FIGS. 1 and 2, an image displaying projector 100 is designed for producing an image on an imaging device from an image signal supplied by a personal computer or a video camera and projecting it onto a screen or a wall.

The image displaying projector 100 has a projection lens 2 provided on the front side of a housing 1 thereof for projecting an optical image produced on the imaging device.

Also, the image displaying projector 100 includes an image projection engine 5 for producing an image on the imaging device and projecting it through the projection lens 2 and a lamp unit 6 for illuminating the imaging screen of the image projection engine 5, both accommodated in the housing 1. The housing 1 comprises an upper cover 1a and a lower case 1b. The image projection engine 5 is anchored to the lower case 1b while the lamp unit 6 is detachably mounted to a lamp housing 7 in the lower case 1b.

Figure 3:
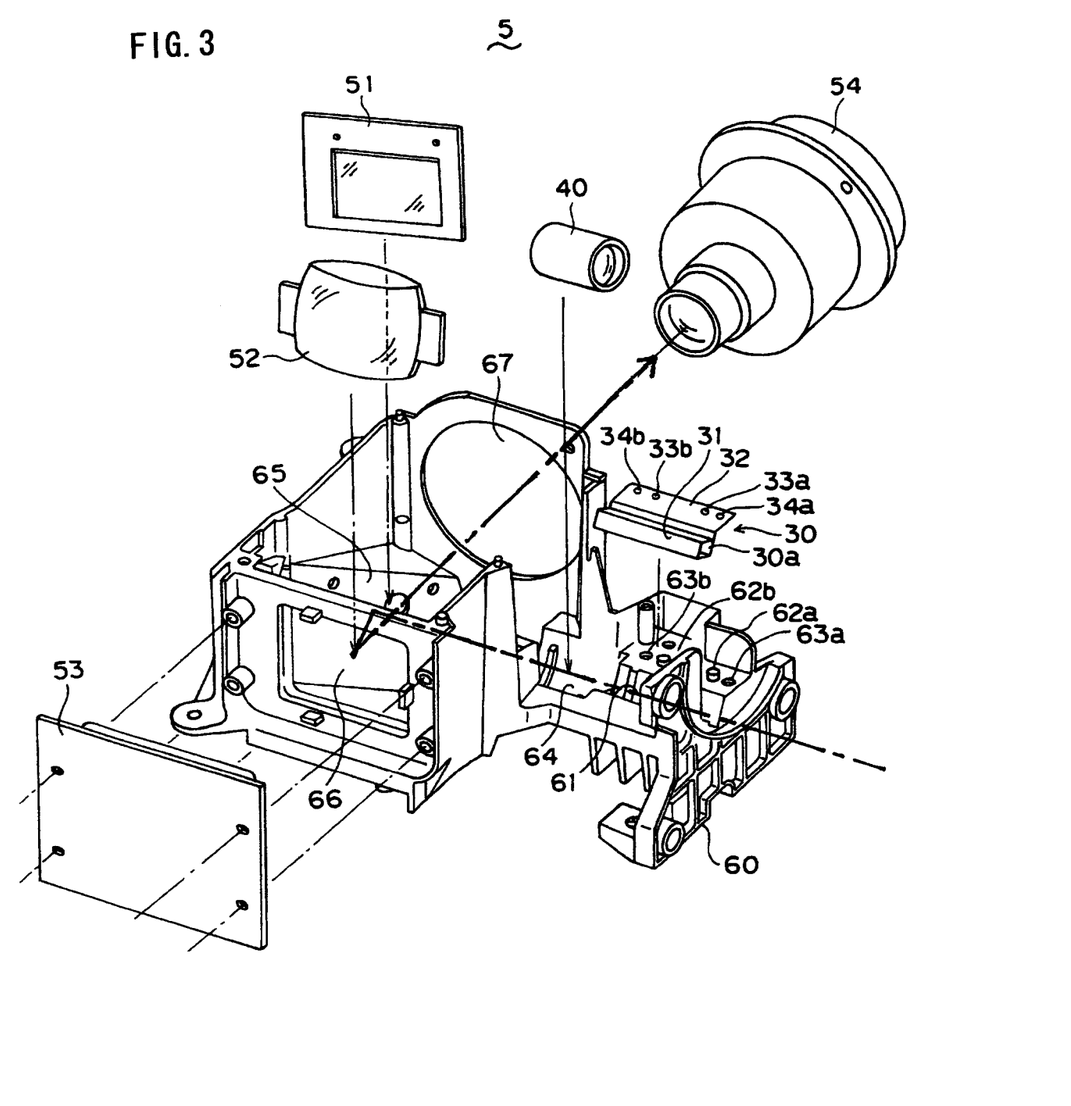
FIG. 3 is an exploded perspective view of an image projection engine in the image displaying projector.

The image projection engine 5 is now explained. As shown in FIG. 3, the image projection engine 5 comprises a light tunnel 30, a tablet (corrective) lens 40, a reflecting mirror 51, a relay lens 52, the imaging device 53, and a projection lens unit 54 which includes the projection lens 2. These components are assembled and mounted on a chassis 60 (an image projection engine body) acting as the support base.

The light tunnel 30 is designed for condensing and collimating the light received from the lamp unit 6 and comprises a tubular portion 31 and a mounting portion 32 formed integral with the tubular portion 31. The light tunnel 30 is made of a thin metal sheet processed on its surface with a reflecting mirror coating. More specifically, the thin metal sheet is bent at one end with its reflecting mirror coating inside to form the tubular portion 31. The other end of the thin metal sheet represents the mounting portion 32.

As the tubular portion 31 is made by bending the thin metal sheet, its has four-sided openings provided at both ends thereof and its inner space acts as a light guiding path for condensing and collimating the input light. Also, the tubular portion 31 has an inner side thereof covered with a reflective mirror coating for inhibiting the absorption of light and guiding the light at a higher efficiency. The mounting portion 32 has a couple positioning apertures 33a and 33b and a couple of screw holes 34a and 34b provided therein for mounting the light tunnel 30 to the chassis 60.

The chassis 60 has a tunnel installing groove 61 of a V-shape in the cross section provided therein for installing the tubular portion 31 of the light tunnel 30, a couple of projections 62a and 62b provided thereon for determining the position of the light tunnel 30, and a couple of screw holes 63a and 63b provided therein for accepting retainer screws (not shown) to retain the light tunnel 30.

With the positioning apertures 33a and 33b of the mounting portion 32 engaging with the positioning projections 62a and 62b, the tubular portion 31 is set at its position in the tunnel installing groove 61. Simultaneously, the screw holes 34a and 34b of the mounting portion 32 are aligned with their respective screw holes 63a and 63b of the chassis 60 when the positioning apertures 33a and 33b engage with the positioning projections 62a and 62b.

Figure 4:
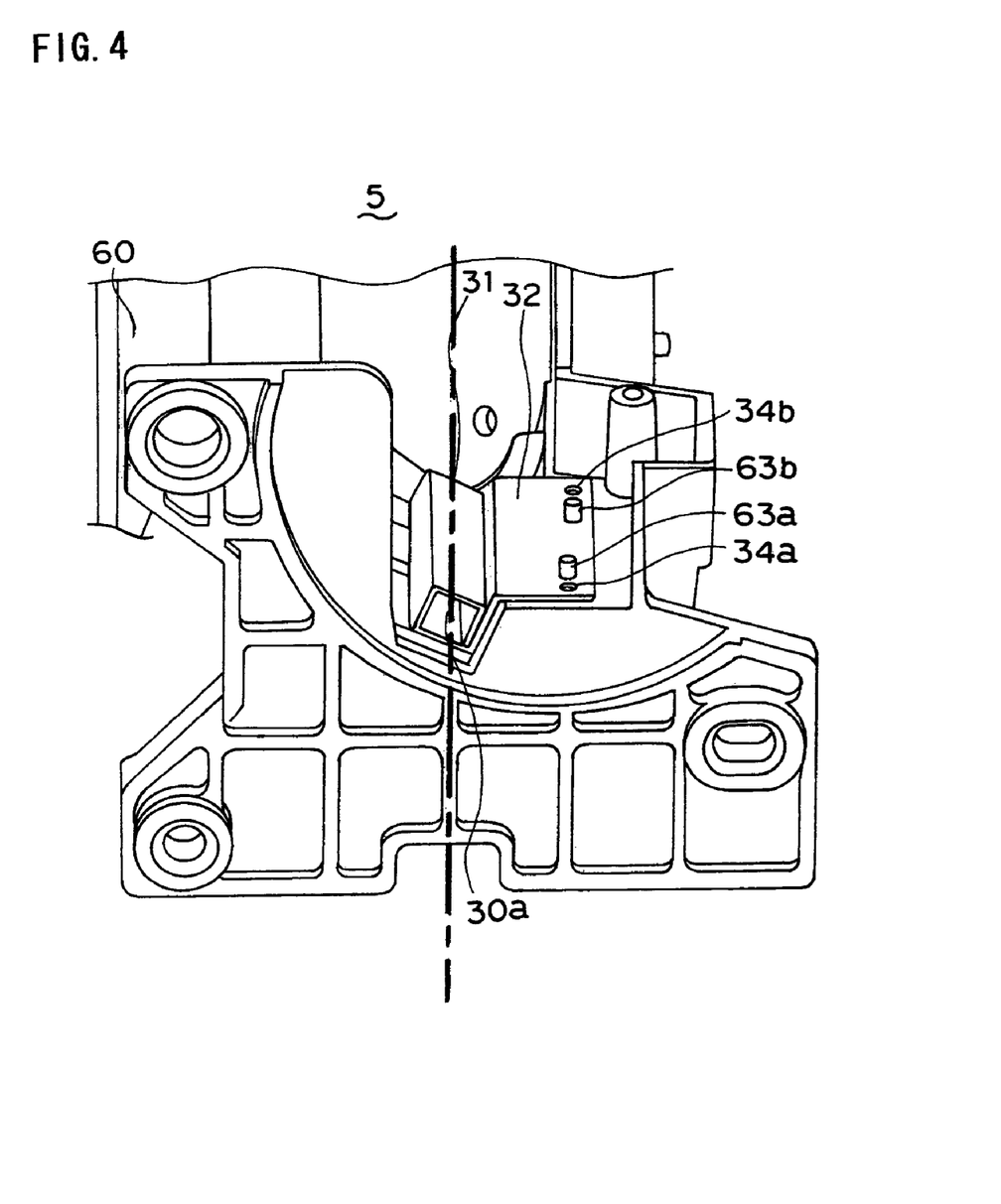
FIG. 4 is a perspective view of the light tunnel mounted to a body in the image displaying projector.

As shown in FIG. 4, the light tunnel 30 can correctly be positioned with its tubular portion 31 seated in the tunnel installing groove 61 through having the positioning apertures 33a and 33b engaged with their respective positioning projections 62a and 62b and the screw holes 34a and 34b aligned with their respective screw holes 63a and 63b. With the retainer screws being threaded in, the light tunnel 30 is fixedly mounted to the chassis 60 with its tubular portion 31 seated in the tunnel installing groove 61.

The light emitted from the lamp unit 6 (denoted by the one-dot chain line with the arrow along the optical axis) is colored by a color wheel (not shown) and received by one end opening 30a (input side) of the tubular portion 31 where it travels through its inner space (the light guiding path) and reflects on its inner wall thus to be condensed and collimated before released from the other end opening (output side).

The tablet lens 40 has a couple of lenses (not shown) held by retainer rings to a tube thereof for compensating the effect of wavelengths of the output light released from the tubular portion 31 of the light tunnel 30. The tablet lens 40 is securely fitted into a lens fitting groove 64 of a semi-circular shape in the cross section provided in the chassis 60 adjacent to the output end of the tubular portion 31.

The reflecting mirror 51 is mounted to a mirror mounting side 65 of the chassis 60 for reflecting the light released from the tablet lens 40. The relay lens 52 is located between the reflecting mirror 51 and the imaging device 53 for converging the light reflected by the reflecting mirror 51 on the imaging device 53.

The imaging device 53 has a matrix of micro-mirrors arranged to form the imaging screen for reflecting the input light and producing its optical image. The imaging device 53 is mounted to an opening 66 of the chassis 60 and can reflect the light released from the relay lens 52 and produce its optical image with the micro-mirrors tilted at angles by a signal from a controller (not shown). The projection lens unit 54 is provided in an opening 67 of the chassis 60 for projecting onto a screen the image produced on the reflected light by the imaging device 53.

As described, the light tunnel 30 is made with ease by simply bending the thin metal sheet to form its tubular portion 31. The light tunnel 30 made of a metallic material has a higher degree of heat radiation and can thus be protected from being deteriorated and fractured by the heat of the light emitted from the lamp unit 6. Also, the light tunnel 30 inhibits the light received from the lamp unit 6 from traveling off its light guide path and interrupting the optical image to be projected. Moreover, the tubular portion 31 and the mounting portion 32 of the light tunnel 30 are formed integral with each other from a single sheet of the metallic material, hence allowing the light tunnel 30 to be mounted to the chassis 60 with no use of extra fittings. The projections 62a and 62b may be replaced by recesses in the chassis 60 which engage with corresponding projections provided on the mounting portion 32 as replacing the positioning apertures 33a and 33b.

Figure 5:
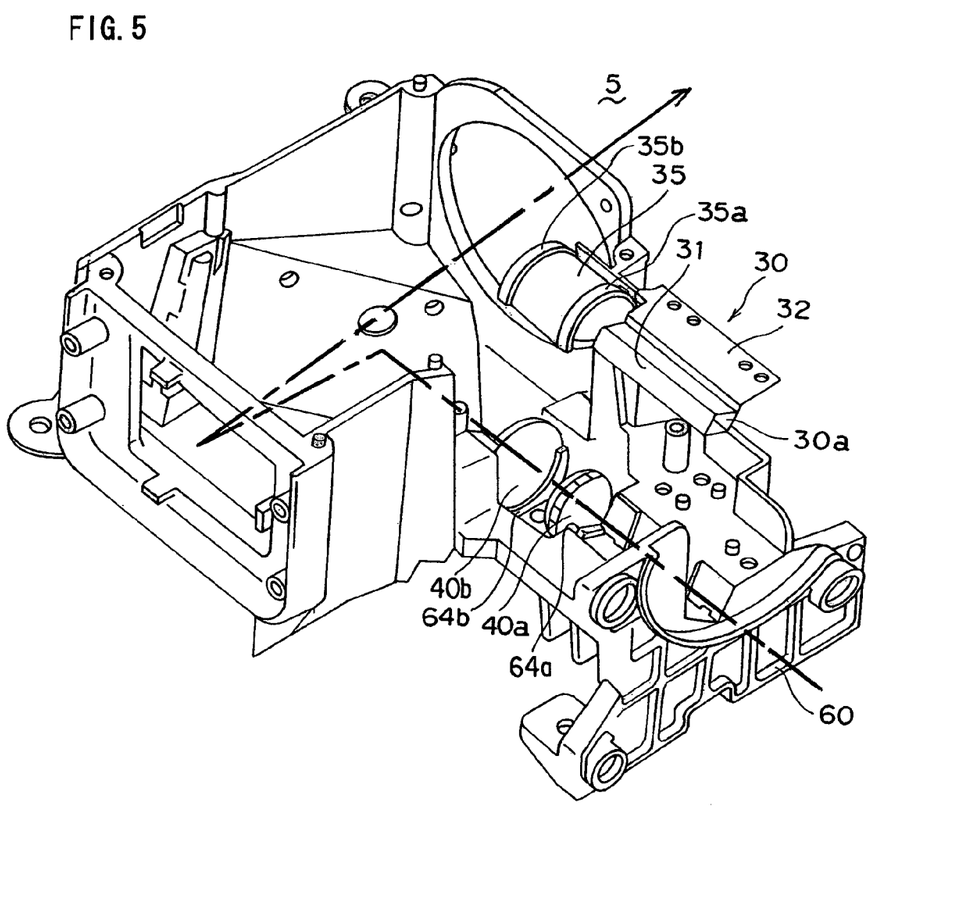
FIG. 5 is a perspective view of a light tunnel showing another embodiment of the present invention.
Figure 6:
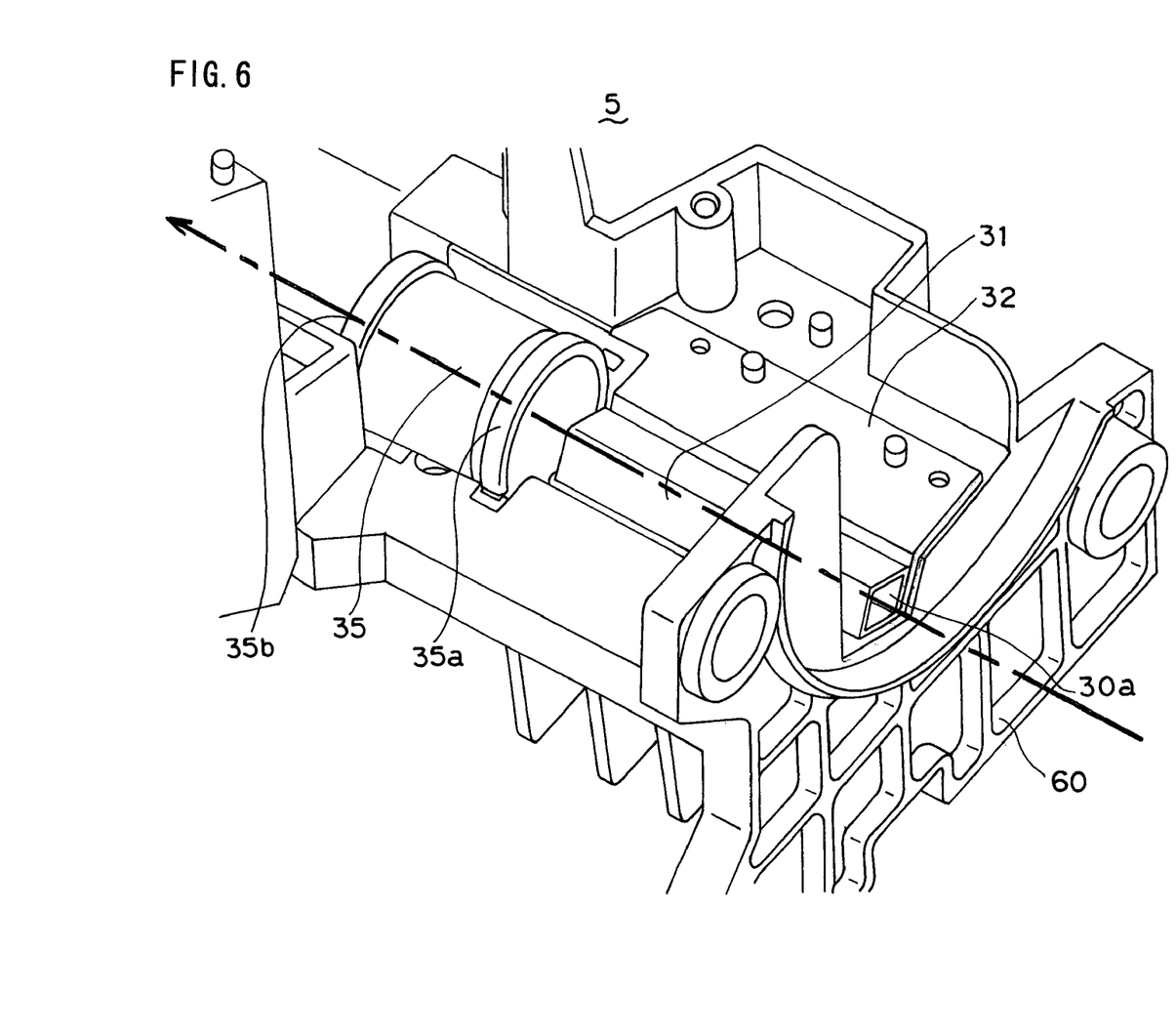
FIG. 6 is a perspective view of the light tunnel mounted to a body.

A second embodiment of the present invention will now be described. As shown in FIGS. 5 and 6, a light tunnel 30 of this embodiment has a tubular portion 31, a mounting portion 32, and specifically a lens holder 35 for holding down a couple of lenses 40a and 40b of a tablet lens. The light tunnel 30 is also made of a thin metal sheet and its tubular portion 31 and mounting portion 32 are identical in the configuration to those of the previous embodiment. The lens holder 35 extends continuously to the mounting portion 32 and the tubular portion 31 with elasticity and is shaped by pressing to have a couple of ring-like ends 35a and 35b for engagement with the upper halves of the two lenses 40a and 40b respectively.

On the other hand, a chassis 60 has a couple of lens holding portions 64a and 64b for holding the lower halves of the two lenses 40a and 40b of the tablet lens. The two lenses 40a and 40b are fitted directly at the lower half with their respective lens holding portions 64a and 64b. The other arrangements of this embodiment are identical to those of the previous embodiment.

When the light tunnel 30 is mounted to the chassis 60, its lens holder 35 holds down with from above its elasticity the two lenses 40a and 40b of the tablet lens fitted with the lens holding portions 64a and 64b of the chassis 60. At the time, the two lenses 40a and 40b can be engaged at the upper half with and securely retained by the corresponding ring-like ends 35a and 35b of the lens holder 35.

Accordingly, in addition of the advantage of the previous embodiment, this embodiment allows the two lenses 40a and 40b of the tablet lens 40 to be fitted to the chassis 60 with not use of extra lens holding components such as a tube and retainer rings.

Figure 7:
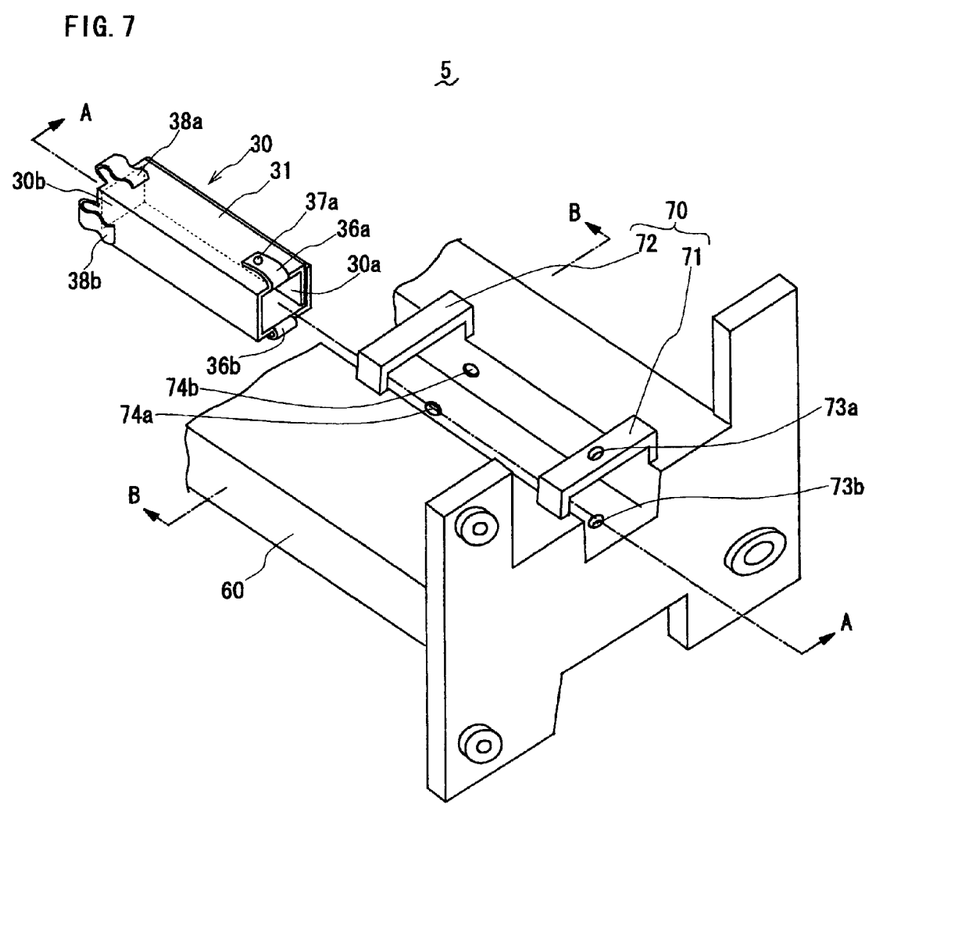
FIG. 7 is a perspective view of a light tunnel showing a further embodiment of the present invention.

A third embodiment of the present invention will be described. Referring to FIG. 7, a light tunnel 30 of this embodiment has a tubular portion 31, input end retainer springs 36a and 36b, output end flexible springs 38a and 38b acting as angle adjusters for mounting the tubular portion 31 to the chassis 60 and adjusting the angle of the tubular portion 31.

The light tunnel 30 is made of a thin metal sheet and its tubular portion 31 is shaped by the same manner as of the previous embodiment where the thin metal sheet is bent with its reflecting mirror coating inside to have a tubular form. The input end retainer springs 36a and 36b are shaped by folding outwardly an upper tab portion and a lower tab portion at the input opening 30a of the tubular portion 31. In particular, the input end retainer spring 36a has a positioning projection 37a provided thereon and the input end retainer spring 36b also has a positioning projection 37b provided thereon. The output end flexible springs 38a and 38b are shaped by folding outwardly an upper tab portion and a left tab portion, seen from the input opening 30a, at the output opening 30b of the tubular portion 31.

The chassis 60 has a tunnel inserting portion 70 provided therein into which the light tunnel 30 is inserted and held in substantially a horizontal direction. The tunnel inserting portion 70 comprises an input end holder 71 for holding the light tunnel 30 adjacent to its input opening 30a and an output end holder 72 for holding the light tunnel 30 adjacent to its output opening 30b.

The input end holder 71 has two positioning apertures 73a and 73b provided in the upper and lower sides thereof respectively for determining the position of the light tunnel 30 at its input opening 30a. The output end holder 72 has two screw holes 74a and 74b provided in the lower side and the left side, seen from the input opening 30a, thereof for threading angle adjusting screws (not shown) for the light tunnel 30. The other arrangements of this embodiment are also identical to those of the previous embodiment.

When the light tunnel 30 is mounted to the tunnel inserting portion 70 of the chassis 60, its tubular portion 31 can be adjusted to a desired angle on the chassis 60.

Figure 8A:
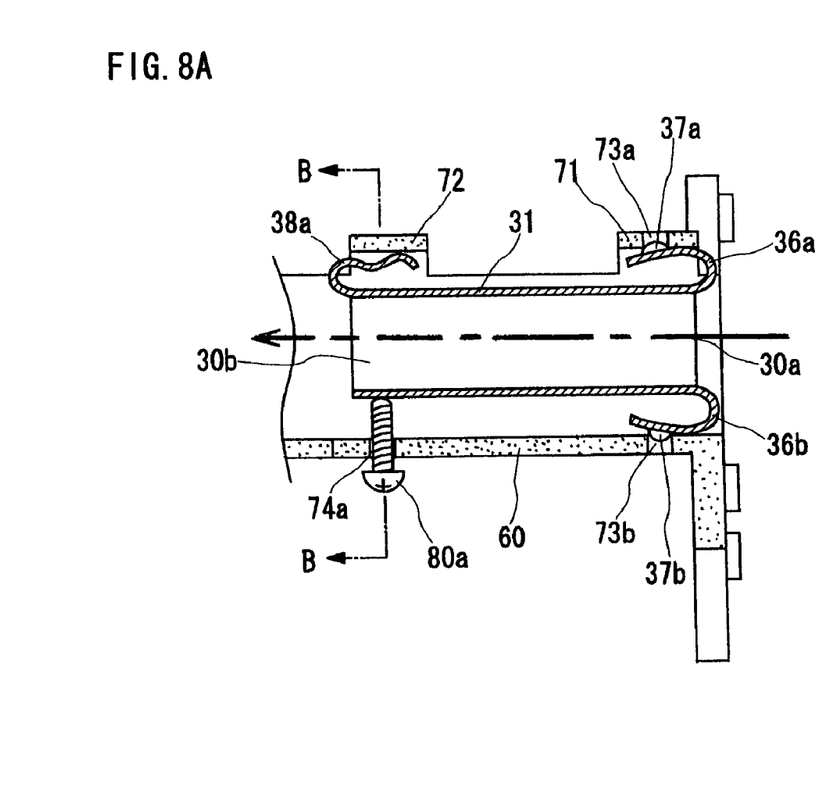
FIGS. 8A and 8B are cross sectional views taken along the line A—A and the line B—B respectively of FIG. 7 with the light tunnel mounted to the body.
Figure 8B:
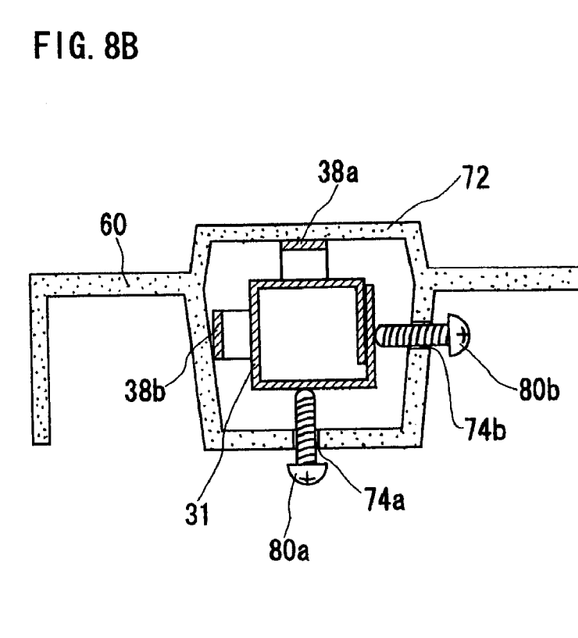

The mounting of the light tunnel 30 to the chassis 60 and the adjustment of its angle will now be described in more detail referring to FIGS. 8A and 8B. As the light tunnel 30 is inserted into the tunnel insertion portion 70, its input end retainer springs 36a and 36b press against the inner wall of the input end holder 71. The positioning projections 37a and 37b are engaged and joined with the corresponding positioning apertures 73a and 73b by the elastic action of the retainer springs 36a and 36b. This permits the light tunnel 30 to be stably secured at the input end with its positioning projections 37a and 37b accepted by the corresponding positioning apertures 73a and 73b due to the elastic effect of the input end retainer springs 36a and 38b.

With the light tunnel 30 remaining secured at the input end, angle adjusting screws 80a and 80b are threaded into the corresponding screw holes 74a and 74b. As the tubular portion 31 is urged at the lower side of the output end by the angle adjusting screw 80a, and at a right side of the input opening 30a by the angle adjusting screw 80b, its output end flexible springs 38a and 37b press against the inner wall of the output end holder 72. This permits the output end of the light tunnel 30 to remain securely held by the pressing force of the two screws 80*a* and 80*b* and the elastic action of the output end flexible springs 38*a* and 38*b*.

When the angle adjusting screw 80*a* is further threaded in, its distal end presses against the lower side at the output end of the tubular portion 31 which is thus lifted upward with the input end acting as a fulcrum and compresses the output end flexible spring 38*a*. Alternatively when the angle adjusting screw 80*a* is loosened, the output end of the tubular portion 31 is lifted down about the fulcrum of the input end by the elastic action of the output end flexible spring 38*a*. By adjusting the threading of the screw 80*a*, the angle of the tubular portion 31 along the upward and downward directions can favorably be controlled.

When the angle adjusting screw 80*b* is further threaded in, its distal end presses against the right side at the output end of the tubular portion 31 which is thus shifted leftward with the input end acting as the fulcrum and compresses the output end flexible spring 38*b*. Alternatively when the angle adjusting screw 80*b* is loosened, the output end of the tubular portion 31 is shifted rightward about the fulcrum of the input end by the elastic action of the output end flexible spring 38*b*. By adjusting the threading of the screw 80*b*, the angle of the tubular portion 31 along the leftward and rightward directions can favorably be controlled.

In addition to the advantages of the previous embodiments, the third embodiment allows the light tunnel 30 set in the tunnel inserting portion 70 of the chassis 60 to be tilted to desired angles along the two, horizontal and vertical, directions through simply threading the angle adjusting screws 80*a* and 80*b*.

This application is based on Japanese utility model application No. 2002-6041 filed in Japan dated Sep. 25, 2002, the contents of which are hereby incorporated by references.

What is claimed is:

1. An image displaying projector for producing and projecting an optical image, comprising:
    a lamp for emitting a light for image projection;
    a light tunnel having a tubular portion with an opening provided at each end, which receives the light from the lamp at one end opening of the tubular portion, and guides the light as it reflects on an inner side of the tubular portion, and releases it from the other end opening of the tubular portion;
    an imaging device for producing an optical image by means of the light released from the light tunnel; and
    an image projection engine body arranged to support the light tunnel and the imaging device, wherein
    the tubular portion of the light tunnel is formed by bending a thin metal sheet in order to provide the opening at each end, and has an inner side processed with a reflective mirror coating, and wherein
    the light tunnel has a mounting portion provided for mounting the light tunnel to the image projection engine body, the mounting portion being configured integral with the thin metal sheet of the tubular portion, and wherein
    the image projection engine body has positioning projections or recesses provided therein for determining the position of the light tunnel and screw holes provided therein for accepting retainer screws to retain the light tunnel, and wherein
    the mounting portion of the light tunnel has positioning apertures or projections for engagement with the corresponding positioning projections or recesses of the image projection engine body and screw holes provided therein to align with the screw holes in the image projection engine body for accepting the retainer screws.

2. An image displaying projector according to claim 1, further comprising a corrective lens for correcting the effect due to the light wavelengths released from the light tunnel, wherein
    the light tunnel has a lens holder for holding the corrective lens, the lens holder being configured integral with the thin metal sheet of the tubular portion.

3. An image displaying projector according to claim 2, wherein
    the image projection engine body has a lens holding portion for accepting the lower half of the corrective lens, and
    the lens holder of the light tunnel is shaped to match with the upper half of the corrective lens and extend continuously with elasticity from the tubular portion for holding down the corrective lens fitted in the lens holding portion of the image projection engine body.

4. An image displaying projector according to claim 1, wherein the light tunnel has an angle adjusting portion for adjusting the angle at which the light tunnel is mounted to the image projection engine body, the angle adjusting portion being configured integral with the thin metal sheet of the tubular portion.

5. An image displaying projector according to claim 4, wherein
    the image projection engine body has a tunnel inserting portion into which the light tunnel is inserted in substantially a horizontal direction, the tunnel inserting portion including an input end holder for holding the tubular portion close to a light inputting end opening of the light tunnel and an output end holder for holding the tubular portion close to a light outputting end opening of the light tunnel,
    the angle adjusting portion has retainer springs provided close to the light inputting end opening of the tubular portion for pressing against an upper inner wall and a lower inner wall of the input end holder and flexible springs provided close to the light outputting end opening of the tubular portion for pressing against an inner sides of the output end holder,
    the retainer springs are made of upper and lower portions bent outwardly at the light inputting end opening of the tubular portion of the thin metal sheet and have positioning projections for determining the position of the light inputting end opening of the tubular portion,
    the input end holder has positioning apertures provided in the upper and lower sides of the input end holder for engagement with the positioning projections of the retainer springs,
    the flexible springs made of an upper portion and either a left or right portion bent outwardly at the light outputting end opening of the tubular portion of the thin metal sheet, and
    the output end holder has angle adjusting screw holes provided in the lower side and the left or right side thereof into which angle adjusting screws are threaded to press against the flexible springs for determining the angle of the light tunnel.

6. A light tunnel structure in an image displaying projector for producing an optical image by means of the light guided therein through the tunnel from a lamp on an imaging device, wherein the light tunnel comprises a tubular portion with an opening provided at both ends, which receives the light from the lamp at one end opening thereof, and guides the light as it reflects on an inner side of the tubular portion, and releases it from the other end opening of the tubular portion, and an image projection engine body arranged to support the light tunnel and the imaging device, wherein the tubular portion is made of a thin metal sheet bent into a tubular form, and having an inner side processed with a reflective mirror coating, and wherein the light tunnel has a mounting portion provided for mounting the light tunnel to the image projection engine body, the mounting portion being configured integral with the thin metal sheet of the tubular portion, and wherein the image projection engine body has positioning projections or recesses provided therein for determining the position of the light tunnel and screw holes provided therein for accepting retainer screws to retain the light tunnel, and wherein the mounting portion of the light tunnel has positioning apertures or projections for engagement with the corresponding positioning projections or recesses of the image projection engine body and screw holes provided therein to align with the screw holes in the image projection engine body for accepting the retainer screws.

7. A light tunnel structure in an image displaying projector according to claim 6, further comprising a corrective lens for correcting the effect due to the light wavelengths released from the light tunnel, wherein the light tunnel has a lens holder for holding the corrective lens, the lens holder being configured integral with the thin metal sheet of the tubular portion.

8. A light tunnel structure in an image displaying projector according to claim 7, wherein the image projection engine body has a lens holding portion for accepting the lower half of the corrective lens, and the lens holder of the light tunnel is shaped to match with the upper half of the corrective lens and extend continuously with elasticity from the tubular portion for holding down the corrective lens fitted in the lens holding portion of the image projection engine body.

9. A light tunnel structure in an image displaying projector according to claim 6, wherein the light tunnel has an angle adjusting portion for adjusting the angle at which the light tunnel is mounted to the image projection engine body, the angle adjusting portion being configured integral with the thin metal sheet of the tubular portion.

* * * * *